United States Patent
Dickey

(10) Patent No.: US 7,461,576 B2
(45) Date of Patent: Dec. 9, 2008

(54) CONTAINER TRIMMING APPARATUS

(75) Inventor: Thomas C. Dickey, Grand Prairie, TX (US)

(73) Assignee: Metal Container Corporation, St. Louis, MO (US)

( * ) Notice: Subject to any disclaimer, the term of this patent is extended or adjusted under 35 U.S.C. 154(b) by 539 days.

(21) Appl. No.: 10/816,721

(22) Filed: Apr. 2, 2004

(65) Prior Publication Data

US 2004/0187656 A1   Sep. 30, 2004

Related U.S. Application Data

(63) Continuation of application No. 10/358,839, filed on Feb. 5, 2003, now Pat. No. 6,748,835.

(60) Provisional application No. 60/354,562, filed on Feb. 5, 2002.

(51) Int. Cl.
 *B23B 1/00*  (2006.01)
 *B23B 3/06*  (2006.01)

(52) U.S. Cl. ............... 82/54; 82/56; 82/58; 82/82; 82/83

(58) Field of Classification Search ............ 82/54, 82/56, 58, 82, 83
 See application file for complete search history.

(56) References Cited

U.S. PATENT DOCUMENTS

| | | | |
|---|---|---|---|
| 3,802,363 A | 4/1974 | Langewis | |
| 3,894,455 A | 7/1975 | Stroobants | |
| 3,916,740 A | 11/1975 | Stroobants | |
| RE28,872 E | 6/1976 | Larkin et al. | |
| 4,023,513 A | 5/1977 | Dean | |
| 4,181,050 A | 1/1980 | Stroobants et al. | |
| RE30,746 E | 9/1981 | Stroobants et al. | |
| 4,557,167 A | 12/1985 | Cvacho | |
| 4,905,552 A | 3/1990 | Shinbori | |
| 4,914,990 A | 4/1990 | Hellweg et al. | |
| 5,054,341 A | 10/1991 | Johanson et al. | |
| 5,146,818 A | 9/1992 | Hellweg | |
| 5,404,776 A | 4/1995 | Johanson et al. | |
| 5,603,250 A | 2/1997 | Robinson | |
| 6,055,893 A * | 5/2000 | Piguet et al. | 82/130 |
| 6,748,835 B2 * | 6/2004 | Dickey | 82/54 |
| 2003/0079592 A1 | 5/2003 | Bowlin | |

* cited by examiner

*Primary Examiner*—Willmon Fridie
(74) *Attorney, Agent, or Firm*—Storm LLP; Paul V. Storm; John J. Patti

(57) ABSTRACT

An improved apparatus for trimming an irregular open end of a container body is disclosed. The improved trimmer cartridge includes a sealed gear housing, for retention of interior lubricant and to reduce contamination. An adjustment mechanism, accessible from the exterior of the housing, is provided to adjust a gap between two blades of the trimmer cartridge. The adjustment mechanism provides improved control over the gap width, which is between 8-25% of the can metal thickness. Additionally, a tang that is removably connected to a shaft for a first blade provides rotational power for the trimmer. The tang is replaceable without requiring the housing to be opened or requiring replacement of the blade shaft. Another blade shaft is provided for a second blade, with the two blade shafts having substantially equal mass. The trimmer also includes spur gears, which do not have the thrust load associated with prior art helical gears.

14 Claims, 5 Drawing Sheets

CONTAINER TRIMMING APPARATUS

This application is a continuation of U.S. patent application Ser. No. 10/358,839 entitled "CONTAINER TRIMMING APPARATUS" filed on Feb. 5, 2003 now U.S. Pat. No. 6,748,835, for inventor Thomas C. Dickey, which claims priority to U.S. Provisional Application Ser. No. 60/354,562 filed on Feb. 5, 2002.

TECHNICAL FIELD

The present invention relates generally to an improved apparatus for trimming the open end of a container prior to being sealed, and more particularly to trimming the open end of aluminum beverage can bodies after the can bodies have been drawn and ironed.

BACKGROUND OF THE INVENTION

The invention relates to an improved apparatus for trimming the uneven surface of an end of aluminum can bodies after the can bodies have been drawn and ironed. Aluminum cans are manufactured from flat sheets of aluminum, which are initially formed into small cups that are much shorter and have a larger diameter than typical finished aluminum cans, such as twelve ounce beverage cans available in the retail market today. The cup is further processed by drawing and ironing, to elongate it into a full can body and reduce the diameter. This process produces an irregular surface of uneven height around the circumference of the open end of the can body. This irregular open end can create problems in further processing of the can. For instance, the can may be rejected at a later step of processing called "the necker" for being out of specification, or if it passes through the necker and is filled and sealed with a lid, the seal may be defective due to the irregular surface at the open end of the can, which may lead to failure of the can.

One way of reducing the likelihood of the can being rejected at "the necker" or resulting in failure due to an inadequate seal caused by this irregular surface, is to trim the open end of the can prior to further processing. Typically, a rotary can trimmer is incorporated into the production line downline from the can body maker equipment. After exiting the body maker, can bodies are typically loaded into an infeed chute that places the can bodies into a star wheel, which feeds the cans to the trimmer. As the cans rotate around the star wheel, they reach the trimmer cartridge one at a time. Prior art trimmer cartridges such as the rotary can trimmer available from Belvac Production Machinery typically include a pair of substantially parallel rotating blades or knives that open and close to allow the can body to be placed in position for trimming and to be removed after trimming is complete. Prior art blades are spaced apart by gap of about 0.0010±0.0002 inches, in a direction perpendicular to the opening and closing direction. The blades typically overlap in the vertical direction when in a closed position to shear the irregular surface from the top of the can body.

Once a can body reaches the trimmer cartridge of the prior art, it is typically held by a vacuum in a horizontal position or a position perpendicular to the opening and closing direction of the blades with the open end of the can toward the blades, placed so that one blade is inside the can body and the other blade is outside the can body. With the blades closed, the can body is then rotated to cause the blades to trim the entire circumference of the can. After trimming is complete, the can body is removed from the trimmer cartridge and discharged through a chute for further processing, such as cleaning, printing, and necking. The trimmed waste piece is discarded away from the trimmer.

Prior art trimmer cartridges have several problematic features. One problem caused by the size of the gap between the blades in the prior art is that the can body may be left with burrs or a jagged edge, particularly at the stop/start point in trimming. A burr or jagged edge at the top of the can body may result in rejection of the can body at downline equipment or result in a defective seal, which are the types of problems that trimming is designed to overcome. Also, the gap between the blades in prior art trimmers is usually only adjustable from inside the housing, requiring the cartridge to be removed to make an adjustment in the gap. The gap is also typically set using shims, which are more likely to be inaccurate or cause fluctuations in the gap during operation.

Additionally, the housing of prior art trimmers, such as the Belvac trimmer, is usually not sealed to hold in lubricant and keep out contaminants. Aluminum shavings and body coolant are possible contaminants that can enter the equipment in a non-sealed system, resulting in more down time for cleaning and repair.

Another drawback of prior art trimmers, such as the Belvac trimmer, is found in the tang, which connects the trimmer cartridge housing to the trimmer equipment and provides rotational power to the trimmer cartridge. Tangs are typically square or octagonal, designed to fit in a corresponding opening in the trimmer machine to be rotated and in turn to rotate one of the trimmer cartridge shafts. The rotation on the tang can cause the edges of the tang to be worn or rounded, requiring the tang to be replaced. Usually, a prior art tang is an integral part of the trimmer housing or an integral part of a blade shaft located within the housing. When it is necessary to replace or perform maintenance on the tang, prior art trimmer cartridges have to be opened, and typically the entire tang and shaft have to be replaced. This increases the downtime required to make the replacement or perform the maintenance, which ultimately increases the expense involved.

Still another problematic feature of prior art trimmer cartridges is the use of helical gears. Although helical gears have their advantages, they also have their disadvantages. The primary disadvantage associated with helical gears is that the angle of their teeth creates a thrust load on the shafts on which the gears are mounted, which must be carried by bearings. A further drawback of prior art. trimmer cartridges relates to the shafts on which the blades are mounted. The use of helical gears, which create thrust on the shafts that rotate the blades is another problematic feature of prior art trimmers. Typically, these shafts are not the same size and consequently are of unequal mass. Temperature changes in the trimmer cartridge will cause unequal thermal variations in the shafts because of the mass differential. These thermal variations create fluctuations in the spacing of the blades, which can result in inconsistent or inadequate trimming of the cans.

SUMMARY OF THE INVENTION

The present invention provides an improved apparatus for trimming the irregular surface of the open end of an aluminum can after the can has been drawn and ironed. This invention may also be used to trim other types of metal containers, but is preferably used for aluminum beverage cans.

A preferred embodiment of the disclosed trimmer apparatus includes two rotating blades to cut the top edge of the can. These blades are preferably substantially parallel to each other. Other embodiments may be used according to the invention, including an embodiment where only one blade is used in combination with a rigid or semi-rigid cutting surface for the single blade to cut against. In a preferred embodiment, a rotating stationary blade is mounted on a shaft that does not allow horizontal or vertical movement of the stationary blade and a rotating pivoting blade is mounted on a shaft contained in an inner housing that allows both horizontal and vertical movement of the pivoting blade. Other configurations, such as where both blade shafts are capable of horizontal or vertical movement, or where one shaft is capable of horizontal movement and the other capable of vertical movement, may be used and are within the scope of the invention.

Another feature of a preferred embodiment of the trimmer apparatus is that the pivoting blade moves in a direction, most preferably in a vertical direction, to cause the blades to open and close around a can body being trimmed. Preferably, the pivoting blade is mounted on a pivoting blade shaft partially contained in an inner housing of the trimmer cartridge. The entire inner housing, including the pivoting blade shaft, the pivoting blade, an adjustment shaft, and bearings, move vertically to open and close the blades. The open position allows placement of a can body to be trimmed and ejection of the can body once trimming is complete. Trimming takes place while the blades are in the closed position.

The blades preferably overlap while in the closed position, resulting in a fixed cut width of about 0.156 inches. Trimmer cartridges in the prior art, such as the Belvac trimmer, have cut widths that are adjustable, which typically results in variations in the cut. A fixed cut width results in more standardized cuts with fewer occurrences of burrs or other irregularities in the cut end of the trimmed can.

An additional feature of a preferred embodiment of the trimmer apparatus is that the two blades are spaced apart in a direction substantially perpendicular to the opening and closing direction by a gap that is between about 8-25% of the metal thickness of the can, and most preferably between about 8-15% of the metal thickness of the can. In a preferred embodiment, this gap is adjustable by an adjustment mechanism, including an adjustment nut and an adjustment screw, accessible from the exterior of the trimmer apparatus, although other adjustment mechanisms may be used according to the invention. As will be understood by those skilled in the art, and as described in more detail below, the adjustment mechanism causes the inner housing, which contains a portion of the pivoting blade shaft to move in this perpendicular direction, which is typically horizontal, to change the width of the gap between the two blades.

Another feature of the invention is that the gear housing of the trimmer apparatus is sealed with sealing mechanisms, with o-rings being the preferred embodiment of sealing mechanism. The sealed housing prevents contamination, such as metal shavings and body coolant, from entering or building up inside the housing, which may lead to malfunction of the trimmer apparatus and hinder the rotation and movement the of the shafts on the interior of the housing. Reduction of contaminants reduces the amount of downtime needed to clean and repair the trimmer apparatus. Additionally, the sealed housing maintains an adequate lubrication for the moving parts contained therein. Although it is preferred that the housing of the trimmer apparatus be sealed, an unsealed housing may be used according to the invention.

Still another feature of a preferred embodiment of the invention is that the mass of the stationary blade shaft is substantially equal to the mass of the pivoting blade shaft. The use of shafts of equal, or near equal, mass reduces the amount of thermal variation between the two shafts, as the impact of temperature fluctuations will be substantially the same. It is preferred to reduce as many variables in the trimmer apparatus as possible, including those created by thermal variations, to avoid variations in the cut width and the gap between the blades during operation. Shafts of unequal mass may also be used within the scope of the invention.

Another preferred feature of the invention is the use of a tang accessible from the exterior of the trimmer cartridge housing and extending through the housing to connect to and rotate one of the shafts, preferably the stationary shaft. The tang is preferably removable without requiring the cartridge housing to be opened and without requiring removal of the shaft that it rotates. This permits easier and faster replacement of the tang when necessary. Additionally, a tang of the preferred embodiment of the invention is square or octagonal. Although it is preferred to use a square or octagonal tang that is replaceable without opening the housing and without also having to replace the shaft, other tang configurations may be used according to the invention.

Still another feature of a preferred embodiment of the invention is the use of spur gears. Preferably, four spur gears are used in combination with four shafts, including the two shafts on which the blades are mounted, a third, idler shaft that is part of the mechanism to adjust the gap between the two blades, and another idler shaft. The use of spur gears reduces the amount of thrust on the shafts, which also reduces fluctuations in the cut and gap widths between the blades. Other types of gears may be used according to the invention, but spur gears are preferred.

A final feature of a preferred embodiment of the invention is the use of a motion translator mechanism that translates motion to a direction that is substantially perpendicular to a motion translator shaft. This motion translator causes the opening and closing movement of the inner housing, pivoting blade shaft, adjustment shaft, and pivoting blade to open and close the blades. Further, the opening and closing movement occurs while maintaining the pivoting blade in a plane substantially parallel to the stationary blade so that the gap between the blades remains substantially the same during the translation movement.

These features, described in detail below, may be used singularly or combined to trim cans with decreased variation in the resulting trimmed edge. The use of the trimmer apparatus of the invention may also decrease the amount of downtime in the can-making process necessary for repair or replacement of various parts of the apparatus and decrease the frequency with which cans are rejected in processing down line from the trimmer and the frequency of failure in sealed cans due to irregularities in the trimmed edge.

BRIEF DESCRIPTION OF THE DRAWINGS

The accompanying drawings are incorporated into and form a part of the specification to assist in explaining the present invention. The drawings are intended for illustrative purposes only and are not intended as exact representations of the embodiments of the present invention. The drawings further illustrate preferred examples of how the invention can be made and used and are not to be construed as limiting the invention to only those examples illustrated and described. The various advantages and features of the present invention will be apparent from a consideration of the drawings in which.

DETAILED DESCRIPTION OF A PREFERRED EMBODIMENT OF THE INVENTION

Figure 1:
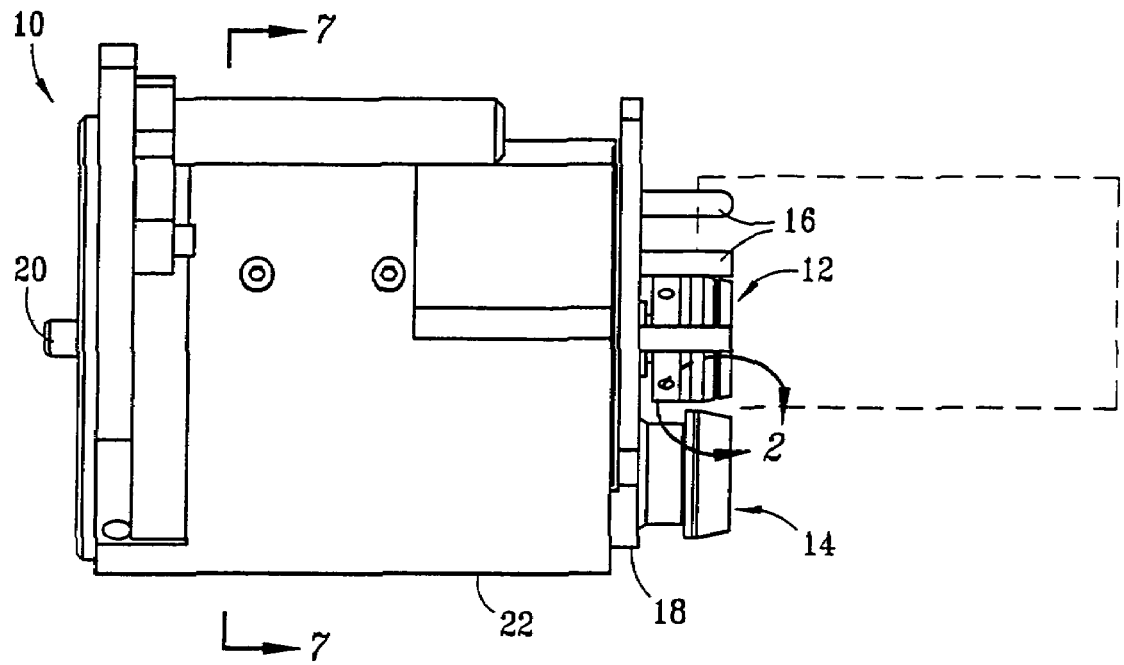
FIG. 1 shows an elevational view of one side of a preferred embodiment of a trimmer cartridge apparatus of the present invention.

The following describes a preferred embodiment of a trimmer cartridge according to the present invention by reference to FIGS. 1-10. Although the preferred embodiment is described, the description is not intended to limit the scope of the invention as defined by the claims. The drawings described are for illustrative purposes only and are not exact scale representations of the embodiments of the present invention. In these drawings, the same reference characters are used throughout the views to indicate like or corresponding parts. The embodiments shown and described herein are exemplary of a preferred embodiment of the invention. Some details of the trimmer apparatus and its method of use are well known in the art, and as such are neither shown nor described. Even though numerous characteristics and advantages of the present invention have been described in the drawings and accompanying text, the description is illustrative only, and changes may be made, especially in matters of arrangement, shape and size of the parts, within the scope of the invention to the full extent indicated by the broad general meaning of the terms used in the claims.

FIG. 1 is an elevational view of a trimmer cartridge 10, according to the present invention and more particularly, illustrative of a preferred embodiment of the present invention. The trimmer cartridge 10 includes a stationary cutter 12 and a pivoting cutter 14 that trim an open end of a can body (shown as a dashed line). The can body is held in a horizontal position on a star wheel (not shown) and inserted on trimmer cartridge 10 by having a bottom side of the open end of the can body placed between stationary cutter 12 and pivoting cutter 14 and a top side of the open end of the can body placed around guide pins 16. The can body is placed so that stationary cutter 12 is located in the interior of the can body and the pivoting cutter 14 is located on the exterior of the can body.

Stationary cutter 12 is referred to as "stationary" because it preferably does not move vertically or horizontally, while pivoting cutter 14 does pivot vertically and moves horizontally, as described below. Both cutters rotate. Stationary cutter 12 and pivoting cutter 14 are shown in an open position to allow insertion of the can body prior to trimming and discharge of the can body after trimming. During trimming operation, these cutters will be in a closed position as described below.

During trimming, stationary cutter 12 and pivoting cutter 14 rotate, as does the can body. The rotational speed of the cutters is determined by the line speed of cans coming from the body maker. Once the can body has made a complete revolution and trimming is complete, the can is removed from the trimmer cartridge and eventually sent through a discharge chute to be further processed. The trim piece or trim ring is left hanging on guide pins 16. A cover plate 18 slides to the end of guide pins 16 to eject the trim ring, which falls down a vacuum chute and is taken away from the can making process. Cam driven lost motion rods (not shown) cause movement of the cover plate 18 to eject the trim ring.

A tang 20 is also depicted in FIG. 1. Tang 20 extends through outer housing 22 and is removably connected to a shaft on which stationary cutter 12 is mounted and tang 20 provides rotational power to that shaft, and where each shaft is adapted to rotate about a central axis. Tang 20 is most preferably square, but may also be octagonal or some other suitable shape. The shape of tang 20 corresponds to a similarly shaped opening in a trimmer machine (not shown). The opening in the trimmer machine causes tang 20 to rotate, which in turn causes the shaft and stationary cutter 12 to rotate. The rotational forces may cause the edges of tang 20 to become worn or rounded, causing slippage inside the opening in the trimmer machine and decreasing the effectiveness of rotation. Therefore, tang 20 needs to be periodically replaced. Due to the placement of tang 20 and its removable connection to the shaft on which stationary cutter 12 is mounted, tang 20 may be replaced without requiring the outer housing 22 be opened and without requiring replacement of the shaft. Tang 20 is preferably secured to the shaft on which stationary cutter 12 is mounted to achieve the removable connection by means of a setscrew. The shaft has a flattened area against which the setscrew is tightened. To replace the tang 20, the setscrew is loosened, the old tang 20 is removed, and a new tang 20' is slid into place, and the setscrew tightened against the shaft to secure the new tang 20' in place.

Additionally, outer housing 22 is preferably sealed by o-rings (not shown) to protect the gears and other moving parts from contamination caused by metal shavings and body coolant. Without such sealing, these contaminants are free to enter and build up inside the housing, which may lead to malfunction of the trimmer cartridge and hinder movement of the parts contained in the housing, which would require more frequent maintenance and increased downtime. Additionally, the sealed outer housing 22 maintains an adequate lubrication for the moving parts contained therein.

Figure 2:
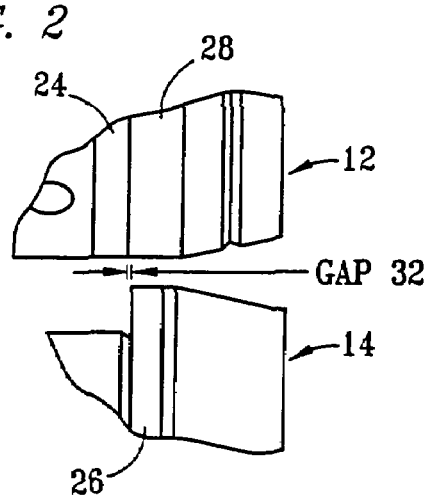
FIG. 2 shows a detailed view of section 2 of FIG. 1.

FIG. 2 is a detailed view of section 2 of FIG. 1, showing a detailed view of stationary cutter 12 and pivoting cutter 14 in the open position. Stationary cutter 12 includes a stationary blade or knife 24. Pivoting cutter 14 includes a pivoting blade or knife 26. Stationary blade 24 and pivoting blade 26 are preferably substantially parallel to each other. These blades are preferably made of carbide, but other materials made be used according to the invention. Again, stationary cutter 12 and pivoting cutter 14 are shown in an open position, as seen by the vertical space between stationary blade 24 and pivoting blade 26. When in a closed position, pivoting cutter 14 moves vertically so that pivoting blade 26 contacts floating ring guard 28. Floating ring guard 28 is preferably made of steel, but other materials may be used according to the invention.

When closed, pivoting blade 26 pushes against floating ring guard 28 so that ring guard 28 compresses a piece of rubber with an x cross section 30 (not shown). This rubber is harder to compress and therefore more stable, causing less fluctuation in the position of the blades during rotation, than the o-rings used in the prior art. Although the use of the x cross-section rubber 30 is preferred, other shapes, including an o-ring, may be used in accordance with the invention.

Stationary blade 24 and pivoting blade 26 are spaced apart by a gap 32. Gap 32 is in a direction substantially perpendicular to the opening and closing direction of pivoting blade 26, which is horizontal in the preferred orientation of FIGS. 1 and 2. This gap 32 is preferably between about 8-25% of the metal thickness of the can body being trimmed, more preferably between about 8-15% of the metal thickness, and most preferably about 10% of the metal thickness. Current can thicknesses are about 0.0058±0.0004 inches. Based on this current thickness, gap 32 is preferably between about 0.000432 and 0.00145 inches, more preferably between about 0.000432-0.00087 inches, and most preferably between about 0.00054-0.00062 inches. As described in more detail below, gap 32 is preferably adjustable from the exterior of outer housing 22, without requiring outer housing 22 to be opened.

Figure 3:
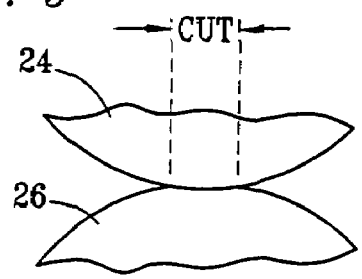
FIG. 3 shows a detailed view of a closed position of cutter blades according to a preferred embodiment of the present invention.

FIG. 3 shows a detailed view of stationary blade 24 and pivoting blade 26 in a closed position. The mechanism for opening and closing the blades is described in detail below. In a closed position, stationary blade 24 and pivoting blade 26 overlap in a vertical direction as depicted in FIG. 3. This overlap results in a cut width that is preferably about 0.156 inches. Some prior art trimmers have adjustable cut widths; however, a preferred trimmer cartridge according to the invention has a fixed cut width to reduce variations during trimming.

Figure 4:
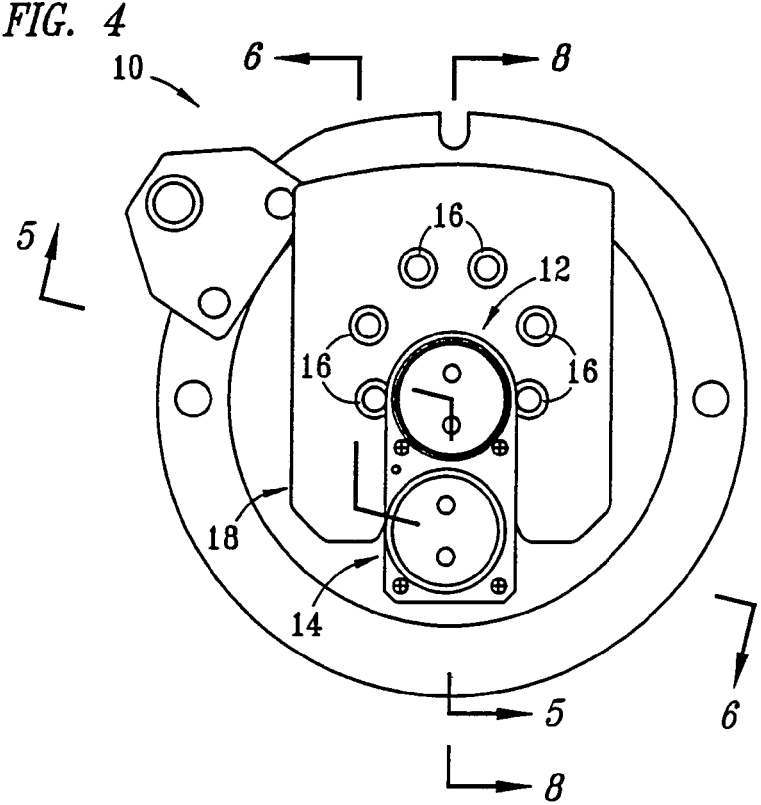
FIG. 4 shows an elevational view of a cutter end of a trimmer cartridge according to a preferred embodiment of the present invention.

FIG. 4 shows an elevational view of a cutter end of a preferred embodiment of a trimmer cartridge according to the invention. The cutter end of trimmer cartridge 10 is the far right side of the cartridge as depicted in FIG. 1. Guide pins 16 are located around the upper portion of stationary cutter 12. These guide pins 16 assist in placement of the can body prior to trimming and retention of the trim ring until the can body is removed after trimming. The top side of the can body is placed around the outside of guide pins 16 while the bottom side of the can body is placed between stationary cutter 12 and pivoting cutter 14. After trimming is complete, cover plate 18 slides to the ends of guide pins 16 to eject or push off the trim ring.

Figure 5:
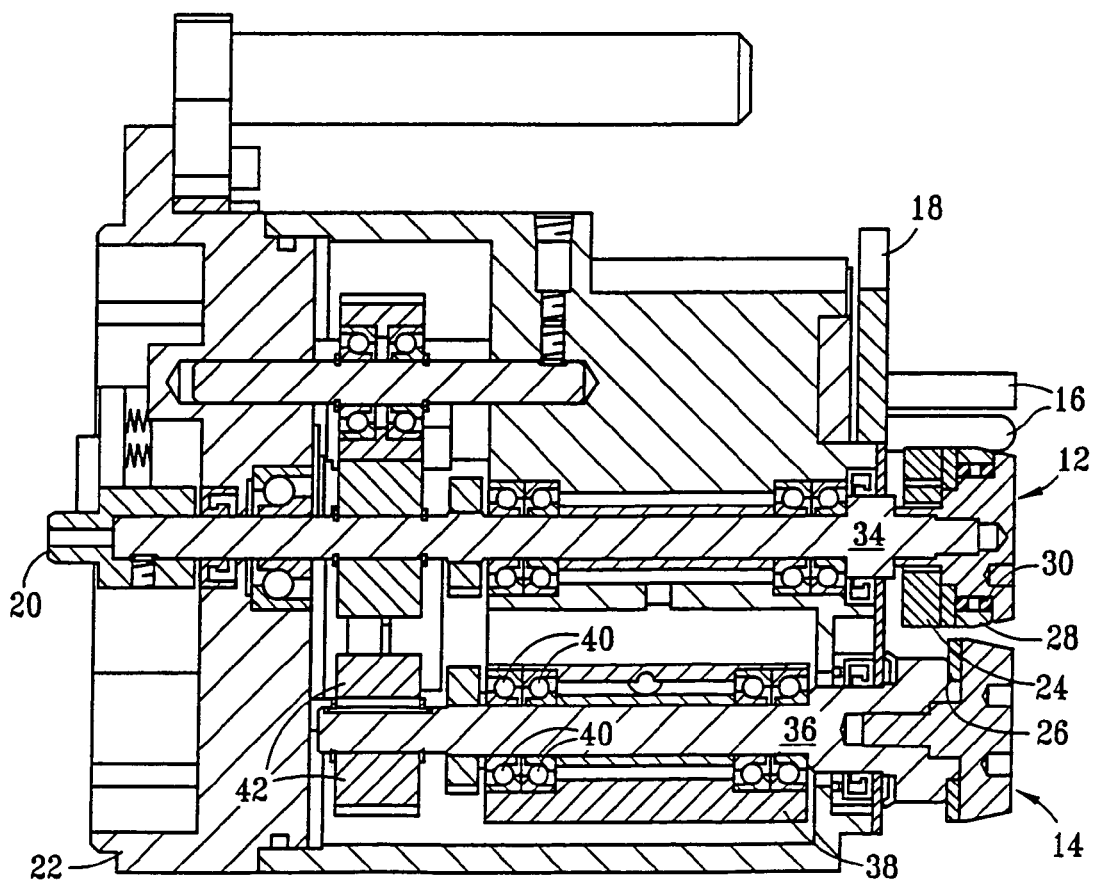
FIG. 5 shows a cross-sectional view along line 5-5 of FIG. 4.

FIG. 5 shows a cross sectional view along line 5-5 of FIG. 4. Stationary cutter 12 is mounted on stationary blade shaft 34, which is removably connected to tang 20. Pivoting cutter 14 is mounted on pivoting blade shaft 36, which is partially contained in inner housing 38. Inner housing 38 also houses zero-end-play bearings 40 for pivoting blade shaft 36. Preferably, inner-housing 38 is sealed from outer housing 22 by o-rings (not labeled). Additional zero-end-play bearings 40 are found along stationary blade shaft 34. Preferably, stationary blade shaft 34 and pivoting blade shaft 36 are of substantially equal mass. The use of shafts that are of substantially equal mass reduces variations between the shafts caused by thermal changes, as such changes would have substantially the same impact on the shafts.

Figure 7:
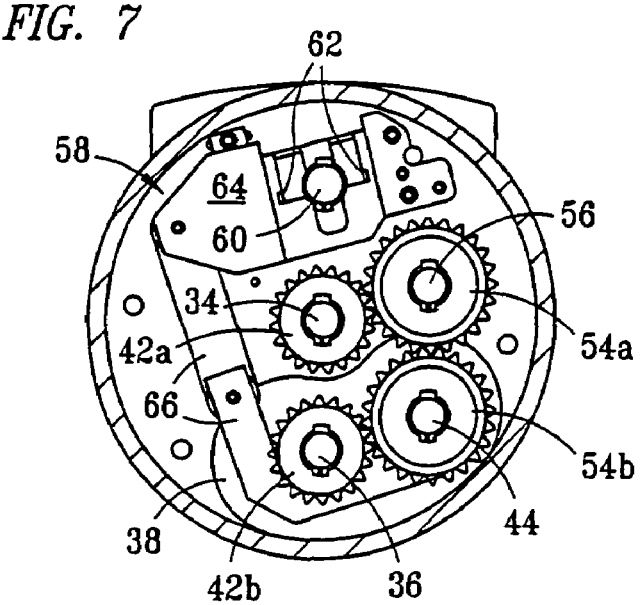
FIG. 7 shows a cross-sectional view along line 7-7 of FIG. 1.

Tang 20 rotates stationary blade shaft 34, which in turn causes rotation of pivoting blade shaft 36 through a series of spur gears (shown in FIG. 7). Keyed spur gears 42 for shaft 34 and shaft 36 are also depicted in FIG. 5. These gears are keyed to rotate with their respective shafts.

Pivoting blade 26 pivots between and open and closed position with respect to stationary blade 24. The blades are depicted in an open position in FIG. 5. The direction of movement of pivoting blade 26 when pivoting between an open and closed position is substantially perpendicular to the length of pivoting blade shaft 36. In the preferred orientation depicted in FIG. 5, the opening and closing direction is vertical. When pivoting blade 26 is in a closed position, pivoting blade 26 pushes against floating ring guard 28, which moves slightly vertically, so that pivoting blade 26 can slightly overlap stationary blade 24. Preferably, when pushed by pivoting blade 26, floating ring guard 28 compresses a piece of rubber 30 with an x-shaped cross-section. The use of an x-shape makes the rubber piece 30 more stable because it is harder to compress.

Figure 6:
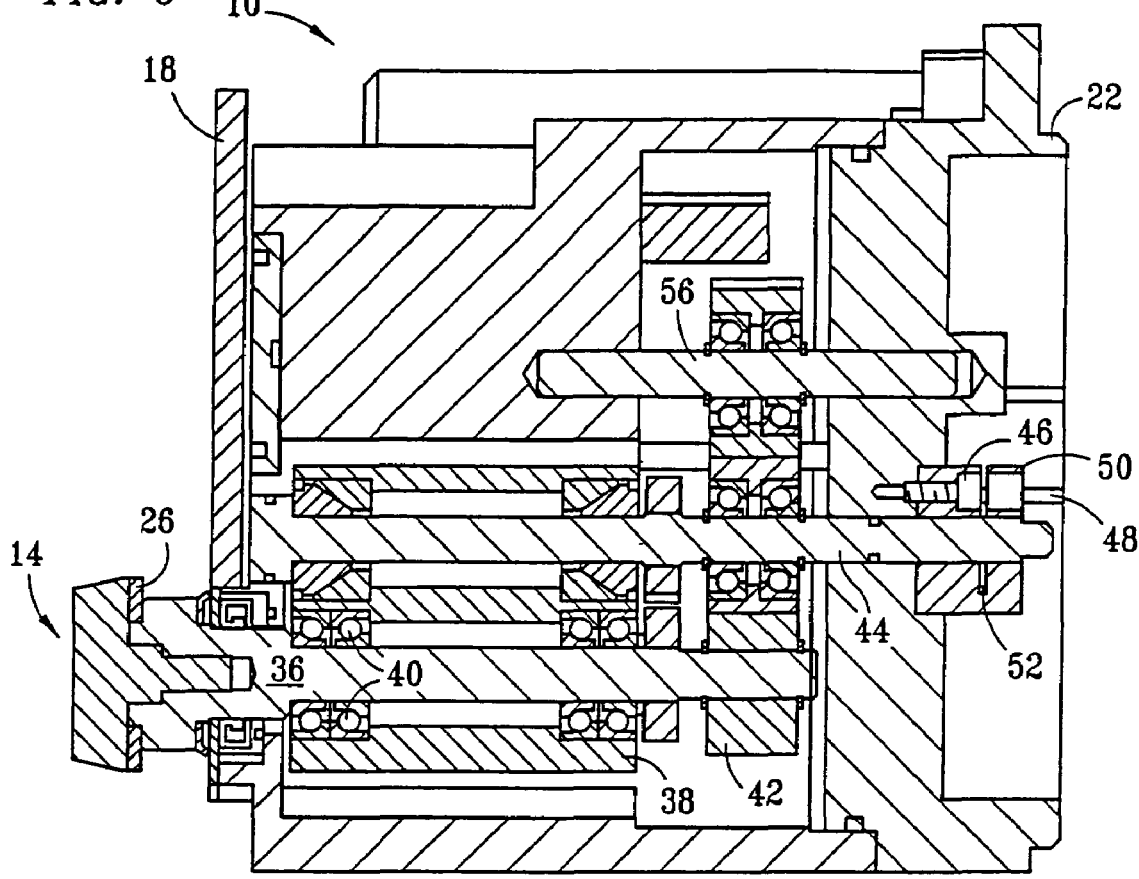
FIG. 6 shows a cross-sectional view along line 6-6 of FIG. 4.

FIG. 6 shows a cross-sectional view along line 6-6 of FIG. 4. Pivoting cutter 14 is capable of movement in a direction along the length of pivoting blade shaft 36 and substantially perpendicular to the length of pivoting blade shaft 36, which is in the horizontal and vertical directions in the preferred orientation of FIG. 6. Horizontal movement of pivoting cutter 14, which adjusts the width of gap 32 (not shown), preferably occurs through an adjustment mechanism accessible from the exterior of outer housing 22. Preferably, trimmer cartridge 10 includes an adjustment shaft 44 that is partially contained in and connected to inner-housing 38. One end of adjustment shaft 44 is threaded and horizontal movement of adjustment shaft 44 (or movement along the length of the shaft) is achieved by turning adjustment screw 46. As adjustment shaft 44 is connected to inner-housing 38 by zero-end-play bearings 40, horizontal movement of shaft 44 causes horizontal movement of inner-housing 38 and its contents, including pivoting blade shaft 36. Movement of pivoting blade shaft 36 in turn causes movement of pivoting cutter 14 and pivoting blade 26. In other words, gap 32 is adjusted through longitudinal movement or displacement of adjustment shaft 44 in the direction of its central axis.

Adjustment screw 46 is accessible from the exterior of outer housing 22 through adjustment access point 48. This allows adjustment of gap 32 without requiring outer housing 22 to be opened. Additionally, as reduction in variation of gap 32 during trimming operations is an important aspect of the invention, the adjustment mechanism of the invention includes a locking mechanism to hold adjustment shaft 44 in place once the desired gap 32 has been set. An adjustment nut 50 is placed in relation to adjustment screw 46 so that a locking piece 52 on adjustment shaft 44 fits into the slot between adjustment screw 46 and nut 50. This prevents further horizontal movement of adjustment shaft 44 until it is desired to make an adjustment. Although this is the preferred configuration for adjusting gap 32, other configurations may be used in accordance with the invention.

FIG. 7 shows a cross-sectional view along line 7-7 of FIG. 1. Stationary blade shaft 34 is rotated by tang 20 (not shown), which causes rotation of spur gear 42a keyed to shaft 34. Rotation of that keyed spur gear 42a causes rotation of non-keyed spur gears 54a and 54b, which rotate on idler shaft 56 and adjustment shaft 44, but do not cause rotation of those shafts. The non-keyed spur gear 54b of adjustment shaft 44 causes rotation of spur gear 42b that is keyed to pivoting blade shaft 36, thereby causing rotation of that shaft. The use of spur gears does not have the thrust on the shafts associated with the use of helical gears in the prior art. Although spur gears are preferred, other types of gears may be used according to the invention.

A preferred trimmer cartridge according to the invention also includes a motion translator 58 that translates motion and power in the direction of the length of the shafts (which would be horizontal motion of the shafts of FIGS. 5 and 6, for instance, or motion in and out of the page in FIG. 7) into motion and power in a direction perpendicular thereto (which would be vertical motion, or motion up and down the page, of FIGS. 5 and 6). A motion translator shaft 60 and cam plate slider keys 62 connected thereto move in and out of the page of FIG. 7. This in and out motion causes cam plate 64 to move vertically, or up and down the page of FIG. 7. Cam plate 64 is connected to inner housing 38 through a series of motion translator linkages 66 that cause the inner housing 38 to pivot vertically. This vertical movement causes pivoting blade 26 (not shown) to pivot between an open and closed position in relation to stationary blade 24 (also not shown).

In FIG. 7, movement of shaft 60 into the page causes cam plate 64 to move up the page, resulting in movement of pivoting blade 26 (not shown) to a closed position. Likewise, in FIG. 7, movement of shaft 60 out of the page causes cam plate 64 to move down the page, resulting in movement of pivoting blade 26 (not shown) to an open position. The space between stationary blade 24 (not shown) and pivoting blade 26 (not shown) while in the open position is about 0.13 inches to allow insertion of a can body between the blades. When in the closed position, stationary blade 24 (not shown) and pivoting blade 26 (not shown) slightly overlap to provide a fixed cut width of about 0.156 inches. Motion translator 58 allows pivoting blade 26 (not shown) to move between an open and closed position while maintaining pivoting blade 26 (not shown) in a plane substantially parallel to that of stationary blade 24 (not shown). This mechanism substantially maintains the gap 32 (shown in FIG. 2) set between the blades.

Figure 8:
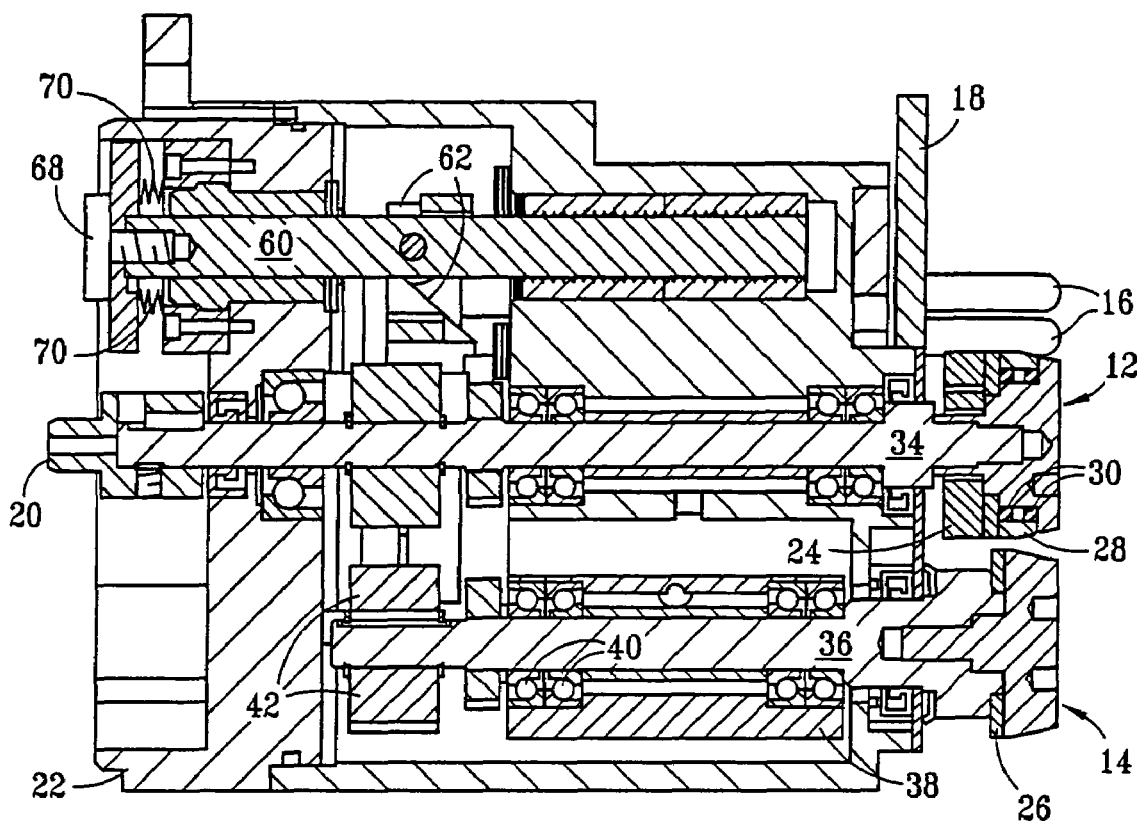
FIG. 8 shows a cross-sectional view along line 8-8 of FIG. 4.

FIG. 8 shows a cross-sectional view along line 8-8 of FIG. 4. Motion translator shaft 60 preferably receives power through cam-driven external power button 68. External power button 68 is compressed to move motion translator shaft 60 along its length (or horizontally as depicted) and to compress the springs 70. The movement of the motion translator shaft 60 also causes movement of cam plate slider keys 62, which are connected to shaft 60. Through the motion translator 58 described above, the horizontal movement of shaft 60 and slider keys 62 are translated into vertical movement of inner housing 38, which in turn causes vertical movement of pivoting cutter 14 to pivot between an open and a closed position.

Figure 9:
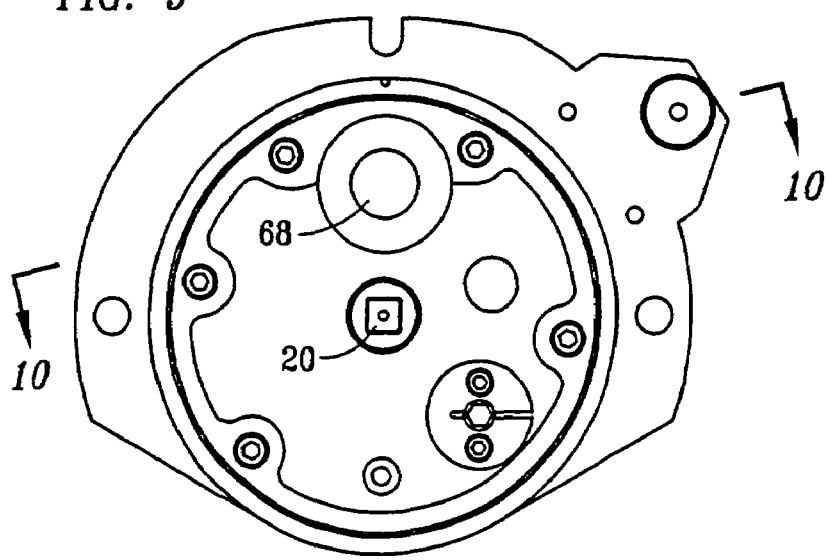
FIG. 9 shows an elevational view of an end opposite that of FIG. 4.

FIG. 9 shows an elevational view of an end opposite that shown in FIG. 4 of a preferred trimmer cartridge according to the invention. External power button 68 and tang 20 are depicted.

Figure 10:
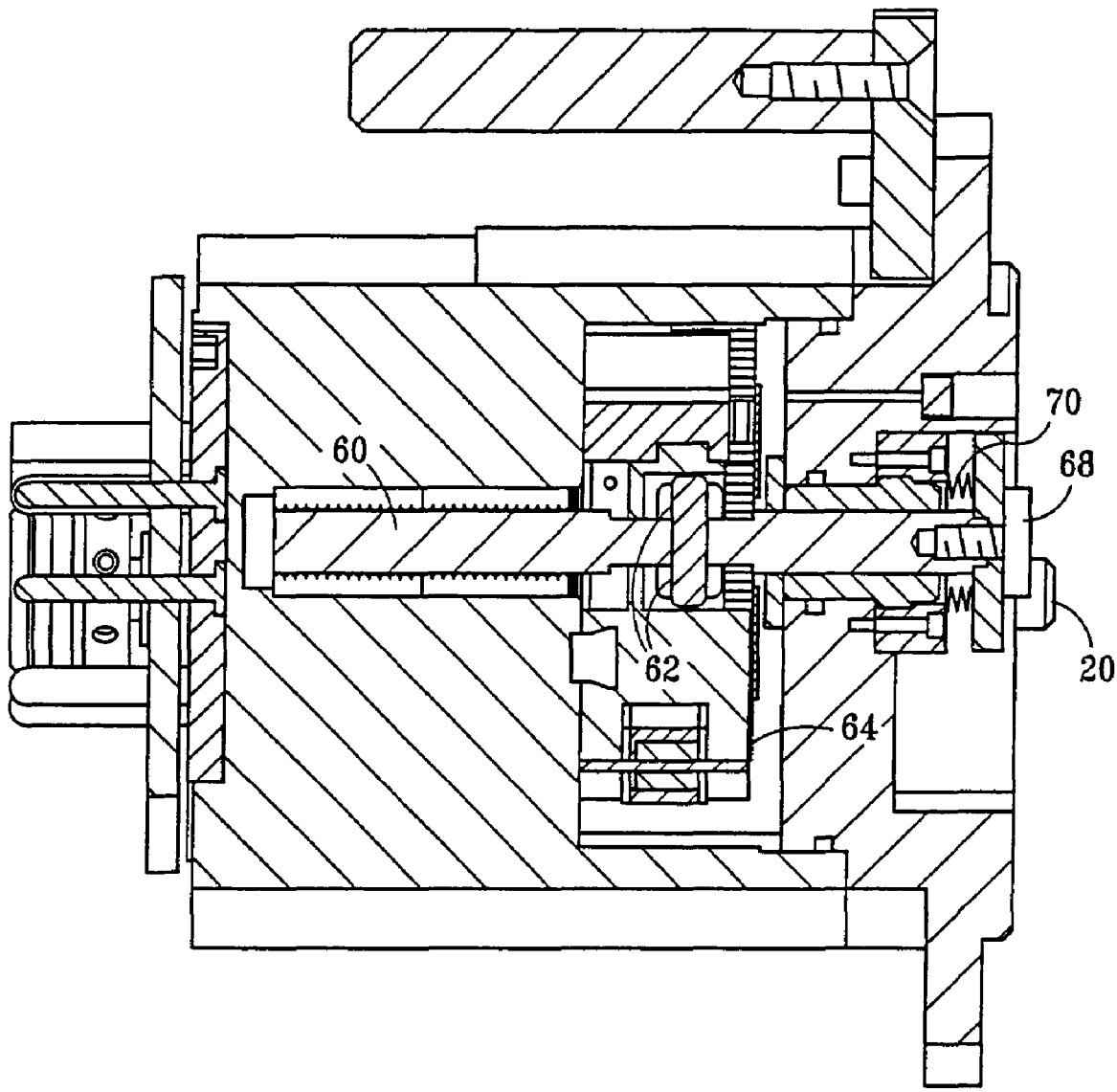
FIG. 10 shows a cross-sectional view along line 10-10 of FIG. 9.

FIG. 10 shows a cross-sectional view along line 10-10 of FIG. 9. This view again depicts external power button 68, springs 70, motion translator shaft 60, cam plate slider keys 62, and cam plate 64 previously described.

The preferred trimmer cartridge 10 described is operated by first setting the width of gap 32 by adjusting adjustment screw 46 and adjustment nut 50 through the adjustment access 48 located on the exterior of outer housing 22 as shown in FIG. 6. This adjustment causes movement of adjustment shaft 44, inner housing 38, and pivoting blade shaft 36 along the length of these shafts. Lubrication is also added to the trimmer cartridge 10 as needed prior to use and is contained by sealed outer housing 22 and inner housing 38. The trimmer cartridge 10 is then placed in a trimmer machine so that tang 20 is aligned with and inserted in a corresponding opening in the trimmer machine and so that external power button 68 is aligned to receive power from the trimmer machine as shown in FIG. 8. The cartridge is then ready to receive cans for trimming. The cartridge need not be removed from the trimmer machine until it is desired to adjust the gap 32 or until the tang 20 needs to be replaced or other interior maintenance is needed.

As previously described, can bodies are loaded on a star wheel after passing through the body maker and are fed to the trimmer cartridge one at a time. The cans are held in a position parallel to the shafts 34, 36 of stationary cutter 12 and pivoting cutter 14 (shown in FIG. 5) by a vacuum. The can is placed so that the top portion of the can is around guide pins 16 and the bottom portion of the can is between stationary cutter 12 and pivoting cutter 14, which are in an open position. During trimming, the can is rotated.

As shown in FIG. 8, motion translator shaft 60 receives power through external power button 68 to move along its length. Movement of motion translator shaft 60 also causes movement of cam plate slider keys 62, which push against cam plate 64 (not shown) causing it to move in a direction substantially perpendicular to the length of motion translator shaft 60. Movement of cam plate 64 (not shown) causes movement of inner housing 38 and pivoting blade shaft 36 in a direction substantially perpendicular to the length of shaft 36. This series of movements pivots pivoting blade 26 to a closed position to trim the can body.

As further shown in FIG. 8, stationary blade shaft 34 is rotated by tang 20, which also rotates stationary blade 24 and a spur gear 42a (not shown) keyed to shaft 34. As shown in FIG. 7, keyed spur gear 42a likewise rotates non-keyed spur gears 54a and 54b. Non-keyed spur gear 54b rotates spur gear 42b, which is keyed to and rotates pivoting blade shaft 36. Rotation of pivoting blade shaft 36 rotates pivoting blade 26 (not shown). Blades 24 and 26 rotate as the can body being trimmed rotates to trim the open end of the can body.

Once trimming is complete, the motion translator shaft 60 moves back to its starting position, thereby moving cam plate slider keys 62, cam plate 64, inner housing 38, and pivoting blade shaft 36 back to their starting positions. This return movement opens pivoting blade 26 to allow the trimmed can body to be removed from trimmer cartridge 10 for further processing and to prepare to receive the next can body to be trimmed. The trim ring remains on guide pins 16 and is ejected by movement of cover plate 18 to the end of guide pins 16. Cam-driven lost motion rods cause movement of the cover plate 18 to eject the trim ring. Once the trim ring is ejected, the trimmer cartridge 10 is ready to receive the next can to be trimmed.

A can body trimmer cartridge apparatus and its operation are described according to the invention. It will be understood by those of skill in the art that variations in the components or arrangement of components described may be made within the scope of the invention.

I claim:

1. A can trimmer apparatus comprising:
    a housing adapted for use in a can production line;
    a plurality of rotatable shafts, each shaft being at least partially disposed in the housing;
    two blades that are each mounted on one of the rotatable shafts that extends from the housing; and
    an adjustment mechanism that is in mechanical communication with at least one shaft and at least one of the blades, that is adapted to displace the at least one shaft longitudinally in the direction of a central axis of the at least one shaft, and that adjusts a gap between the blades through axial displacement of at least one of the rotatable shafts.

2. The can trimmer apparatus of claim 1 further comprising a locking mechanism to substantially maintain the position of one of the rotatable shafts once the gap is adjusted.

3. The can trimmer apparatus of claim 1 wherein the gap is about 8-25% of the thickness of the metal of a can.

4. The can trimmer apparatus of claim 1 further comprising a sealed gear housing.

5. The can trimmer apparatus of claim 4 wherein the housing is sealed by o-rings.

6. The can trimmer apparatus of claim 1 further comprising spur gears.

7. A can trimmer apparatus comprising:
- a housing adapted for use in a can production line;
- a plurality of rotatable shafts, each shaft being at least partially disposed in the housing;
- a first blade mounted on a first shaft of the plurality of rotatable shafts that extends from the housing;
- a second blade mounted on a second shaft of the plurality of rotatable shafts that extends from the housing, wherein the first and second shafts are about the same mass; and
- means for adjusting a gap between the first and second blades through longitudinal displacement of at least one of the plurality of rotatable shafts in the direction of a central axis of the at least one of the plurality of rotatable shafts, the means for adjusting is in mechanical communication with at least one rotatable shaft and at least one of the first and second blades.

8. The can trimmer apparatus of claim 7 further comprising:
- a motion translator to translate the direction of motion of the second blade between open and closed positions with substantially no motion in the direction of the gap.

9. The can trimmer of claim 8 further comprising a sealed gear housing.

10. The can trimmer apparatus of claim 8 wherein the gap is about 8-25% of the thickness of the metal of a can.

11. The can trimmer apparatus of claim 8 wherein the gap is about 8-15% of the thickness of the metal of a can.

12. The can trimmer apparatus of claim 8 wherein the gap is about 8-10% of the thickness of the metal of a can.

13. The can trimmer of claim 8 wherein the adjustment mechanism is accessible from the exterior of the apparatus.

14. The can trimmer of claim 13 wherein the adjustment mechanism comprises:
- an adjustment screw;
- an adjustment nut; and
- a locking mechanism.

* * * * *